US011927907B2

(12) United States Patent
Shiba

(10) Patent No.: US 11,927,907 B2
(45) Date of Patent: Mar. 12, 2024

(54) IMAGE FORMING DEVICE

(71) Applicant: TOSHIBA TEC KABUSHIKI KAISHA, Tokyo (JP)

(72) Inventor: Tetsuo Shiba, Yokohama Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/847,261

(22) Filed: Jun. 23, 2022

(65) Prior Publication Data

US 2023/0009456 A1 Jan. 12, 2023

(30) Foreign Application Priority Data

Jul. 12, 2021 (JP) ................................ 2021-114774

(51) Int. Cl.
*G03G 15/00* (2006.01)
*B65H 29/58* (2006.01)
*G03G 21/16* (2006.01)

(52) U.S. Cl.
CPC ......... *G03G 15/6561* (2013.01); *B65H 29/58* (2013.01); *G03G 15/6529* (2013.01); *G03G 15/6555* (2013.01); *G03G 21/1695* (2013.01); *B65H 2404/632* (2013.01); *B65H 2404/741* (2013.01); *G03G 2215/00675* (2013.01)

(58) Field of Classification Search
CPC ........... G03G 15/6561; G03G 15/6529; G03G 15/6555; G03G 21/1695; G03G 2215/00675; B65H 29/58; B65H 2404/632; B65H 2404/741
See application file for complete search history.

(56) References Cited

U.S. PATENT DOCUMENTS 8,351,839 B2 * 1/2013 Matsumoto ........ H04N 1/00615 399/361
2004/0251609 A1 * 12/2004 Taniguchi .............. B65H 29/58 271/225
2010/0314827 A1 * 12/2010 Nishii ................ G03G 15/6561 271/264

(Continued)

FOREIGN PATENT DOCUMENTS

JP 2001335216 A * 12/2001
JP 2006219207 A * 8/2006

(Continued)

*Primary Examiner* — Ryan D Walsh
(74) *Attorney, Agent, or Firm* — Amin, Turocy & Watson, LLP

(57) ABSTRACT

An image forming device including a gate mechanism reduces a noise generated when a sheet is conveyed. The image forming device includes a conveyance path and a gate. The conveyance path is branched into a plurality of paths, and the sheet is conveyed along a conveyance direction. The gate is provided at a position in the conveyance path at which the conveyance path is branched into the plurality of paths, and switches a path through which the sheet is conveyed. The image forming device rotates the gate in a direction in which a contact point of the gate, which faces a front surface of the sheet to be conveyed and is located at a position at which a trailing end of the sheet first comes into contact with the gate, and a front surface of the sheet to be conveyed face each other.

17 Claims, 10 Drawing Sheets

(56) References Cited

U.S. PATENT DOCUMENTS

| | | | | |
|---|---|---|---|---|
| 2012/0098188 | A1* | 4/2012 | Ito | B65H 29/58<br>271/207 |
| 2014/0159303 | A1* | 6/2014 | Suzuki | G03G 15/234<br>271/226 |
| 2016/0368727 | A1* | 12/2016 | Yoshitsugu | B65H 31/24 |
| 2018/0093839 | A1* | 4/2018 | Nakahara | B65H 31/24 |
| 2020/0103810 | A1* | 4/2020 | Miyauchi | G03G 15/6529 |
| 2023/0128182 | A1* | 4/2023 | Tsuji | B65H 29/58<br>270/1.01 |

FOREIGN PATENT DOCUMENTS

| | | | | |
|---|---|---|---|---|
| JP | 4244191 | | 3/2009 | |
| JP | 2017119559 A | * | 7/2017 | B65H 29/58 |

* cited by examiner

*FIG. 8*

| | | | | | | | | | |
|---|---|---|---|---|---|---|---|---|---|
| SHEET INFORMATION | TYPE OF SHEET | SHEET SA | | | | SHEET SB | | | |
| | PROCESSING SURFACE | ONE SIDE | | BOTH SIDES | | ONE SIDE | | BOTH SIDES | |
| GATE INFORMATION | ROTATION DIRECTION ROTATION AMOUNT | DIRECTION | AMOUNT | DIRECTION | AMOUNT | DIRECTION | AMOUNT | DIRECTION | AMOUNT |
| | FIRST OPERATION | | | + | 3 | | | + | 3 |
| | SECOND OPERATION | | | − | 3 | | | − | 3 |
| | THIRD OPERATION | | 0 | | 0 | − | 1 | − | 1 |
| | FOURTH OPERATION | + | 1 | + | 1 | + | 2 | + | 2 |
| | FIFTH OPERATION | − | 1 | − | 1 | − | 1 | − | 1 |

IMAGE FORMING DEVICE

CROSS-REFERENCE TO RELATED APPLICATION

This application is based upon and claims the benefit of priority from Japanese Patent Application No. 2021-114774, filed on Jul. 12, 2021, the entire contents of which are incorporated herein by reference.

FIELD

Embodiments described herein relate generally to an image forming device and a sheet path switching apparatus.

BACKGROUND

In an image forming device, a conveyance path of a sheet is switched between one-sided printing and two-sided or duplex printing, and a gate is used to switch a path of the conveyance path. A solenoid is used as a drive source of the gate.

In the related art, in the conveyance of a sheet in an image forming device, a gate mechanism is used to invert the front and back of the sheet, and a trailing end of the sheet to be conveyed may come into contact with the gate in a manner of hitting the gate, and a noise may be generated.

DESCRIPTION OF THE DRAWINGS

FIG. 8 is a table showing examples of sheet information and gate information;

DETAILED DESCRIPTION

In general, according to one embodiment, an image forming device including a gate mechanism, which reduces a noise generated when a sheet is conveyed, is provided. The image forming device according to the present embodiment includes a conveyance path and a gate. The conveyance path is branched into a plurality of paths and a sheet is conveyed along a conveyance direction. The gate is provided at a position in the conveyance path at which the conveyance path is branched into the plurality of paths, and switches a path through which the sheet is conveyed. The image forming device rotates the gate in a direction in which a contact point of the gate, which faces a front surface of the sheet to be conveyed and is located at a position at which a trailing end of the sheet first comes into contact with the gate, and a front surface of the sheet to be conveyed face each other.

Hereinafter, embodiments will be described with reference to drawings.

Figure 1:
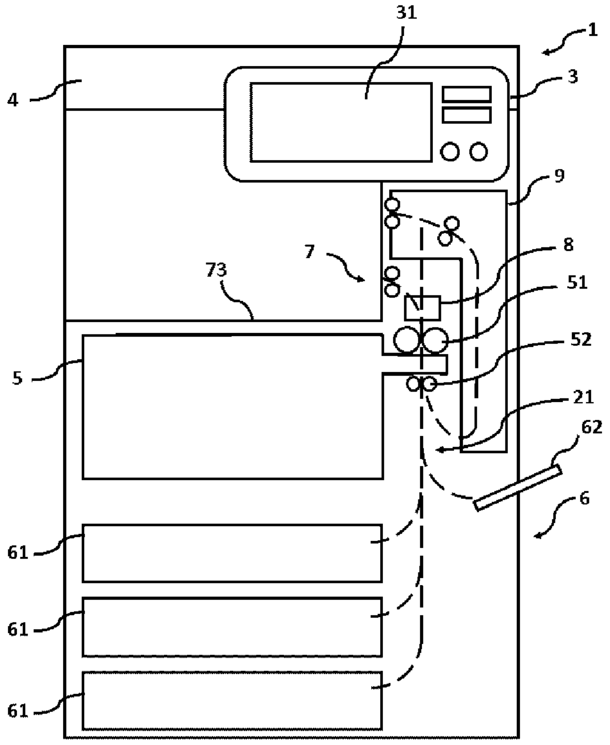
FIG. 1 is a diagram showing a schematic configuration of a multifunction peripheral according to an embodiment.

FIG. 1 is a diagram showing a schematic configuration of a multifunction peripheral 1. The image forming device according to the present embodiment is the multifunction peripheral 1. The multifunction peripheral 1 prints an image on a sheet-shaped medium such as paper. The multifunction peripheral 1 shown in FIG. 1 includes a conveyance unit 2, a control panel 3, a scanner 4, a printer 5, a paper feed unit 6, a paper discharge unit 7, a gate mechanism 8, and an inversion unit 9. The multifunction peripheral 1 includes a conveyance path 21 of a sheet in which the paper feed unit 6 is located on an upstream side in a conveyance direction of the sheet and the paper discharge unit 7 is located on a downstream side in the conveyance direction of the sheet.

Figure 2:
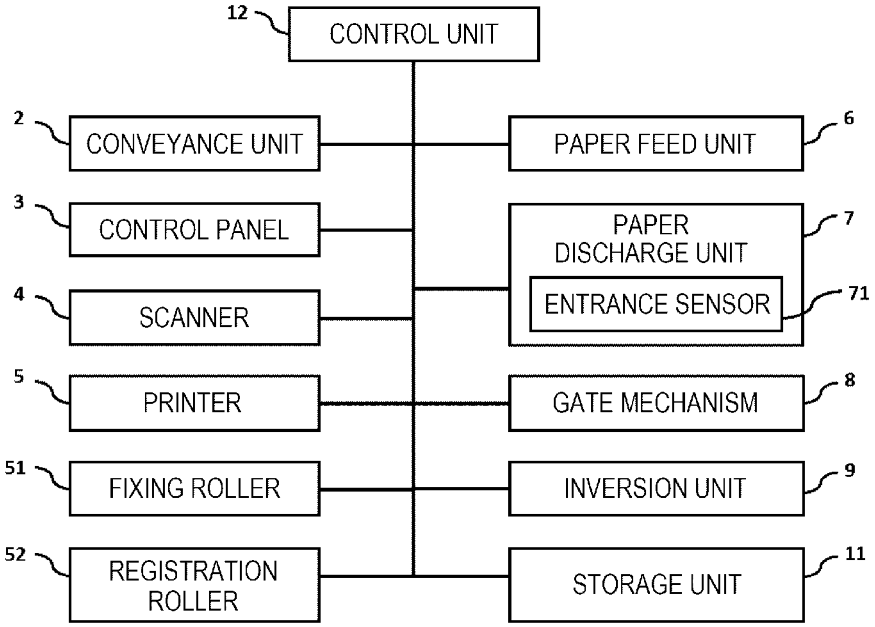
FIG. 2 is a block diagram showing a hardware configuration.

FIG. 2 is a block diagram showing a hardware configuration example of the multifunction peripheral 1. As shown in FIG. 2, the multifunction peripheral 1 further includes a storage unit 11 and a control unit 12. The control unit 12 controls the conveyance unit 2, the control panel 3, the scanner 4, the printer 5, the paper feed unit 6, the paper discharge unit 7, the gate mechanism 8, the inversion unit 9, and the storage unit 11.

The conveyance unit 2 conveys a sheet picked up from the paper feed unit 6 to the printer 5 along the conveyance path 21. The conveyance unit 2 conveys the sheet to the paper discharge unit 7 after the printer 5 prints an image on the sheet. The conveyance unit 2 includes a plurality of conveyance rollers everywhere in the conveyance path 21 as conveyance portions for conveying the sheet.

The control panel 3 includes a plurality of buttons that accept an operation performed by a user. The control panel 3 outputs a signal corresponding to the operation performed by the user to the control unit 12 of the multifunction peripheral 1. The control panel 3 is a touch panel integrated with a display 31. The display 31 displays information on the multifunction peripheral 1. The display 31 is an image display device such as a liquid crystal display and an organic electro luminescence (EL) display.

The scanner 4 reads an image to be read and stores the read image as image information. The scanner 4 includes, for example, an auto document feeder (ADF) or a dual scan document feeder (DSDF). The stored image information may be transmitted to another information processing device via a network. The recorded image information may be printed as an image on the sheet by the printer 5.

The printer 5 forms a toner image on the sheet based on the image information transmitted from the scanner 4 or an external device such as a personal computer (PC).

The multifunction peripheral 1 includes a registration roller 52 and a fixing roller 51. The registration roller 52 is provided upstream of the printer 5 in the conveyance direction of the sheet. The fixing roller 51 is provided downstream of the printer 5 in the conveyance direction of the sheet. The registration roller 52 temporarily stops the conveyance of the sheet and conveys the sheet to the printer 5 at any timing by the control unit 12. The fixing roller 51 fixes the toner image formed on the sheet by the printer 5 by heat and pressure. The fixing roller 51 conveys the sheet to a paper discharge unit.

The paper feed unit 6 contains, for example, a sheet on which the image is to be printed. The paper feed unit 6 includes a plurality of paper feed cassettes 61 and a manual feed tray 62. The sheet on which the image is to be printed may be a sheet contained in the paper feed cassettes 61 or a sheet manually placed in the manual feed tray 62. The sheet is conveyed from the paper feed cassettes 61 or the manual feed tray 62 along the conveyance path 21, and is conveyed to the paper discharge unit 7 through the printer 5.

Figure 3:
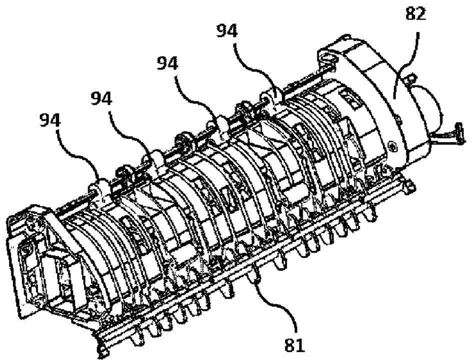
FIG. 3 is a perspective view showing a gate.
Figure 4:
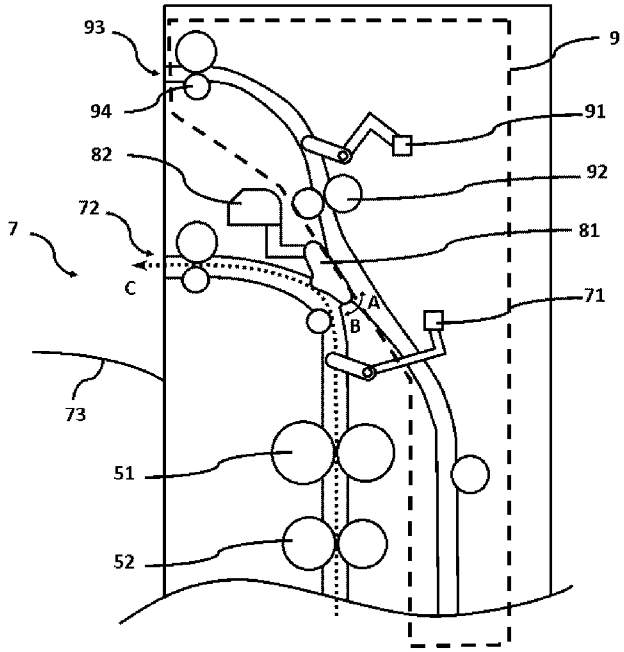
FIG. 4 is a diagram showing a state in which a path to an inversion unit is closed in a conveyance path.
Figure 5:
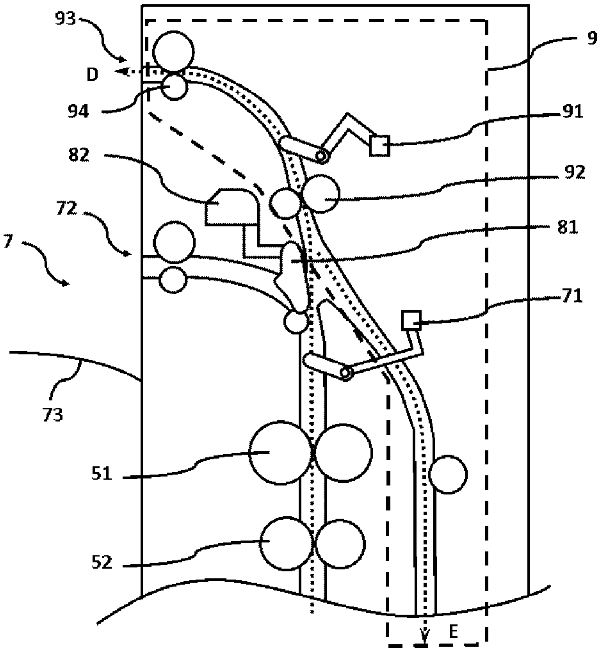
FIG. 5 is a diagram showing a state in which the path is opened.
Figure 6:
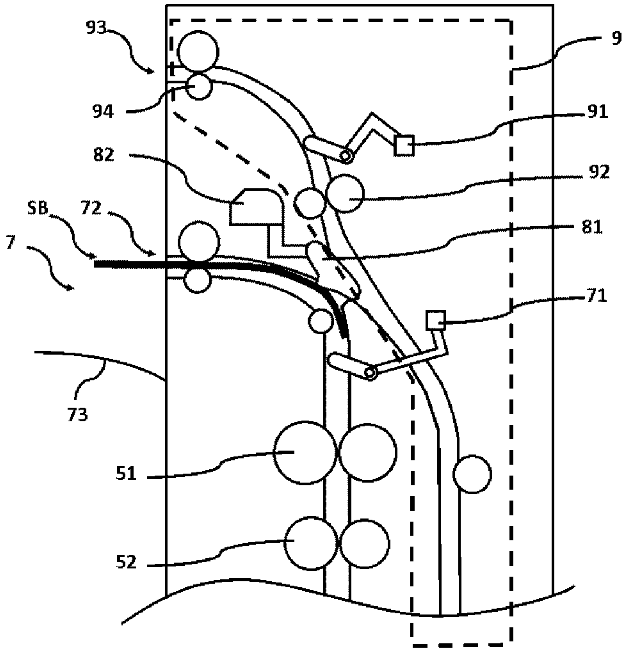
FIG. 6 is a first diagram showing conveyance of a sheet in the conveyance path.
Figure 7:
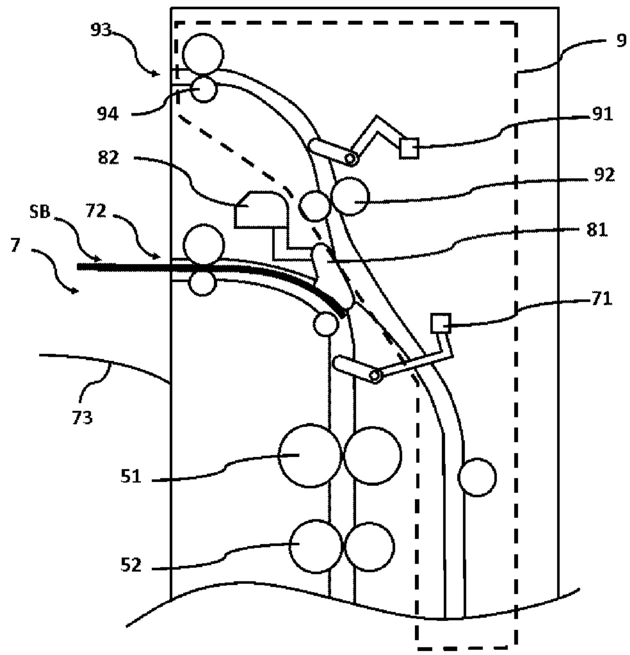
FIG. 7 is a second diagram showing the conveyance of the sheet.

The paper discharge unit 7 and the inversion unit 9 will be described with reference to FIGS. 3 to 7. FIG. 3 is a perspective view showing the gate. FIG. 4 is a diagram showing a state in which a path to the inversion unit 9 is closed in the conveyance path 21. That is, FIG. 4 shows a state in which no sheet is conveyed to the inversion unit 9. FIG. 5 is a diagram showing a state in which a path to the inversion unit 9 is opened in the conveyance path 21. That is, FIG. 5 shows a state in which the sheet is conveyed to the inversion unit 9. FIG. 6 is a first diagram showing the conveyance of the sheet in the conveyance path 21. FIG. 6 is a diagram showing a state in which a path to a first paper discharge port 72 is further opened as compared with FIG. 4. FIG. 7 is a second diagram showing the conveyance of the sheet in the conveyance path 21. Letters A and B indicated by arc arrows in FIG. 4 indicate directions (A direction, B direction) in which a gate 81 rotates. A broken line arrow C shown in FIG. 4 and broken line arrows D and E shown in FIG. 5 indicate conveyance directions of the sheet. As shown in FIG. 4, a position of the gate 81 by which the path to the first paper discharge port 72 is opened is set as an initial position. When the gate 81 is at the initial position, the sheet conveyed from the printer 5 is guided to the paper discharge unit 7. The gate 81 at the initial position is rotatable in the A direction or the B direction.

The paper discharge unit 7 discharges the conveyed sheet to a paper discharge tray 73. The paper discharge unit 7 includes an entrance sensor 71.

The entrance sensor 71 detects that the sheet is conveyed to the paper discharge unit 7. The entrance sensor 71 is disposed upstream of the gate 81 in the conveyance direction of the sheet. The entrance sensor 71 is, for example, a solenoid type sensor. The type of the entrance sensor 71 is not limited as long as the entrance sensor 71 can detect that the sheet is conveyed to the paper discharge unit 7.

The gate mechanism 8 specifies to which conveyance path 21 among a plurality of the branched conveyance paths 21 the sheet is conveyed. The gate mechanism 8 includes the gate 81 and a motor 82. In a state in which there is no step between the conveyance path 21 and the gate 81 in a posture to guide the sheet to the first paper discharge port 72 of the paper discharge unit 7, or in a state in which the gate 81 in the posture is raised from the conveyance path 21, a point at which the gate 81 in the posture and a trailing end of the sheet to be conveyed to the paper discharge port 72 first come into contact with each other is referred to as a first contact point. That is, the first contact point is a point at which the gate 81 and the trailing end of the sheet to be conveyed to the paper discharge port 72 first come into contact with each other in a state in which the trailing end of the sheet does not hit the gate 81 in the posture. The first contact point may be changed for each sheet to be conveyed.

When the gate 81 in the posture in which the sheet is guided to the first paper discharge port 72 of the paper discharge unit 7 is depressed from the conveyance path 21 and a step is generated, a point at which the trailing end of the sheet to be conveyed to the paper discharge unit 72 first comes into contact with the gate 81 in the posture is on a downstream side of the first contact point in the conveyance direction of the sheet. In this case, the trailing end of the sheet to be conveyed to the paper discharge port 72 does not come into contact with the first contact point.

As shown in FIG. 3, the gate 81 is a member including a plurality of protrusions extending in a direction intersecting with a shaft extending in a width direction of the sheet to be conveyed. The gate 81 is driven by the motor 82. The gate 81 rotates about the shift by an operation of the motor 82. The gate 81 guides the sheet conveyed from the printer 5 by the conveyance unit 2 to the first paper discharge port 72 of the paper discharge unit 7 or the inversion unit 9. The gate 81 is driven by the motor 82. The gate 81 is provided at a branch point between the paper discharge unit 7 and the inversion unit 9 in the conveyance path 21. The switching of a conveyance path of the sheet in the conveyance path 21 is based on a relative rotation amount from the initial position of the gate 81 to a position to which the gate 81 rotates. The rotation amount is a movement amount by which the gate 81 rotates from one position to another position.

The motor 82 drives the gate 81. The motor 82 is a stepping motor that rotates by a predetermined rotation amount each time a pulse signal is received. The predetermined rotation amount is based on the number of steps of the stepping motor. The predetermined rotation amount is, for example, 10 degrees in one step in the case of the stepping motor having 36 steps. Therefore, the stepping motor rotates by a rotation amount of 10 degrees each time the pulse signal is received. A rotational speed of the motor 82 is controlled by a speed at which the pulse signal is received. The motor 82 can rotate in normal direction and rotate in reverse direction. For example, the gate 81 rotates in the B direction when the motor 82 rotates in normal direction, and the gate 81 rotates in the A direction when the motor 82 rotates in reverse direction. A rotation amount of the gate 81 is based on the rotation amount of the motor 82. A rotational speed of the gate 81 is based on the rotational speed of the motor 82. The motor 82 is controlled by the control unit 12.

The inversion unit 9 inverts a sheet when printing is performed on both sides of the sheet. The inversion unit 9 includes an inversion sensor 91 and an inversion roller 92. The inversion unit 9 is an automatic duplexing unit (ADU).

The inversion sensor 91 detects that a sheet is conveyed to the inversion unit 9. The inversion sensor 91 is disposed downstream of the gate 81 in the conveyance direction of the sheet. The inversion sensor 91 is, for example, a solenoid type sensor. The type of the inversion sensor 91 is not limited as long as the inversion sensor 91 can detect that the sheet is conveyed to the inversion unit 9.

The inversion roller 92 conveys a sheet in the inversion unit 9. The inversion roller 92 can rotate in normal direction and rotate in reverse direction. A rotation direction of the inversion roller 92 is controlled by the control unit 12.

When a sheet is conveyed to the first paper discharge port 72, the gate 81 does not need to be opened to the maximum angle in a movable range in the A direction, and the gate 81 may be opened to any angle as long as the sheet is conveyed to the first paper discharge port 72. When a sheet is conveyed to the inversion unit 9, the gate 81 does not need to be opened to the maximum angle of a movable range in the B direction, and the gate 81 may be opened to any angle as long as the sheet is conveyed to the inversion unit 9.

An operation of the gate mechanism 8 will be described by taking, as an example, a flow of a sheet in image printing. For example, when an image is printed on one side of the sheet, the image is printed by the printer 5 on the sheet fed from the paper feed unit 6. The sheet that passes through the printer 5 is guided to the gate 81 and conveyed in the direction of the broken line arrow C shown in FIG. 4, that is, to the first paper discharge port 72. The sheet is discharged from the first paper discharge port 72 and stacked on the paper discharge tray 73.

For example, when images are printed on both sides of a sheet, the image is printed on one side of the sheet fed from the paper feed unit 6 by the printer 5. The sheet that passes through the printer 5 is guided by the gate 81 driven in the B direction, and is conveyed in the direction of the broken line arrow D shown in FIG. 5, that is, to a second paper discharge port 93. At this time, depending on a size of the sheet, a leading end of the sheet may be discharge from the second paper discharge port 93, but the sheet is not discharged up to a trailing end of the sheet. When the sheet passes through the inversion sensor 91, the motor 82 drives the gate 81 to return to the initial position, and the inversion roller 92 rotates in reverse direction to convey the sheet in a direction of a broken line arrow E. The switched back sheet is conveyed to the registration roller 52. The printer 5 prints an image on the other side of the sheet conveyed by the registration roller 52. The sheet that passes through the printer 5 is guided to the gate 81 and conveyed in the direction of the broken line arrow C shown in FIG. 4, that is, to the first paper discharge port 72. The sheet is discharged from the first paper discharge port 72 and stacked on the paper discharge tray 73.

The storage unit 11 is, for example, a hard disc drive (HDD) or a solid state drive (SSD). The storage unit 11 acquires, for example, image data or the like acquired or generated by each configuration of the multifunction peripheral 1. The storage unit 11 stores sheet information and gate information. The sheet information includes information on the type of sheet and information on a processing surface of the sheet. The information on the type of sheet indicates, for example, plain paper or thick paper. The information on the processing surface of the sheet is information on whether to print on one side of the sheet or on both sides of the sheet. The gate information includes information on a rotation direction of the gate 81 and information on a rotation amount of the gate 81. The gate information is stored in correlation with the sheet information. The information on the rotation amount of the gate 81 may be stored, for example, as the number of pulse signals given to the motor 82. The information on the rotation direction of the gate 81 may be stored, for example, as + (plus) or − (minus).

FIG. 8 is a table showing examples of the sheet information and control information of the motor 82. Regarding the type of sheet shown in FIG. 8, a sheet SB is thicker than a sheet SA and has a strong returning force. The type of sheet is specified by the settings of the control panel 3 and the paper feed cassettes 61. According to the present embodiment, the sheet SA is plain paper and the sheet SB is thick paper. The processing surface shown in FIG. 8 is a surface of the sheet on which processing is performed. The processing is, for example, printing an image on a sheet. The one side is one side of the sheet. The both sides include the one side and the other side of the sheet. Regarding a rotation direction in FIG. 8, − (minus) indicates that the gate 81 rotates in the A direction, and +(plus) indicates that the gate 81 rotates in the B direction. Regarding a rotation amount in FIG. 8, 0 indicates a rotation amount of the gate 81. For example, 0 indicates that the pulse signal is not given to the motor. 1 indicates a rotation amount of the gate 81, which is larger than that indicated by 0. 1 is, for example, the rotation amount of the gate 81 when the pulse signal is given to the motor 82 once. 2 indicates a rotation amount of the gate 81, which is larger than that indicated by 1. 2 indicates, for example, the rotation amount of the gate 81 when the pulse signal is applied to the motor 82 twice. 3 indicates a rotation amount of the gate 81, which is larger than that indicated by 2. 3 indicates, for example, the rotation amount of the gate 81 when the pulse signal is applied to the motor 82 three times. When the rotation amount is indicated by 0, the gate 81 does not rotate, and thus no rotation direction is described. The number of pulse signals given to the motor 82 can be appropriately changed depending on the number of steps of the motor 82 or the like. A first operation to a fifth operation will be described later.

The control unit 12 includes a processor including a central processing unit (CPU) or a micro processing unit (MPU), and a memory. The memory is, for example, a semiconductor memory, and includes a read only memory (ROM) that stores various control programs and a random access memory (RAM) that provides a temporary work area to the processor. The control unit 12 controls each unit of the multifunction peripheral 1 based on various programs or the like stored in the ROM.

The control unit 12 can change a position of the gate 81 to a position suitable for each type of sheet by rotating the gate 81 through controlling the motor 82 according to the type of a sheet to be conveyed.

For example, the gate 81 shown in FIG. 4 shows a state when the sheet SA is conveyed. The gate 81 shown in FIG. 6 shows a state when the sheet SB having a returning force stronger than that of the sheet SA is conveyed. The gate 81 shown in FIG. 6 rotates more greatly in the A direction than the gate shown in FIG. 4. FIGS. 6 and 7 show the sheet SB.

When a sheet having a strong returning force, such as the sheet SB, is conveyed, it is desirable to control the motor 82 to rotate the gate 81 in the A direction. As shown in FIG. 6, the sheet SB is conveyed while being curved along an inclination direction of the conveyance path, but since an angle of the gate 81 is larger in the A direction as compared with FIG. 4, a load on the sheet, the gate 81, and the like is reduced. By controlling the position of the gate 81 according to the type of sheet, a load applied to the sheet to be conveyed or the multifunction peripheral 1 is reduced.

By rotating the gate 81 in the direction (B direction) in which a front surface of the sheet to be conveyed toward the paper discharge port 72 and the first contact point face each other, a noise generated when a trailing end of the sheet comes into contact with the gate 81 in a manner of hitting the gate 81 can be reduced. By rotating the gate 81 in the B direction so that the front surface and the trailing end of the sheet to be conveyed to the paper discharge port 72 continuously come into contact with the first contact point of the gate 81, the noise generated when the trailing end of the sheet comes into contact with the gate 81 in a manner of hitting the gate 81 can be further reduced. As shown in FIG. 7, by rotating the gate 81 in the B direction before a trailing end of the sheet SB reaches the first contact point of the gate 81, a noise generated when the trailing end of the sheet SB comes into contact with the gate 81 due to the returning force of the curved sheet SB is reduced.

The first operation to the fifth operation that are shown in FIG. 8 will be described later.

The first operation and the second operation indicate an operation of the gate 81 when a sheet is conveyed to the inversion unit 9 during duplex printing. The first operation rotates the gate 81 in the B direction to connect the path to the inversion unit 9. The second operation rotates the gate 81 in the A direction to close the path to the inversion unit 9. The second operation returns a position of the gate 81 rotated by the first operation to the initial position. In a case of one-sided printing, the first operation and the second operation are not executed.

The third operation and the fourth operation indicate an operation of the gate 81 when a sheet is conveyed to the first paper discharge port 72. The third operation controls the operation of the gate 81 so that a position of the gate 81 becomes a position suitable for the sheet to be conveyed. The third operation controls the rotation amount of the gate 81 according to the type of sheet. For example, a position of the gate 81 suitable for conveyance of the sheet SA, which has a returning force weaker than that of the sheet SB, is the initial position. Therefore, in the third operation when the sheet SA is conveyed, the gate 81 does not rotate. For example, a position of the gate 81 suitable for conveyance of the sheet SB having the returning force stronger than that of the sheet SA is a position at which the gate 81 is appropriately opened in the A direction to such an extent that the sheet can be conveyed to the first paper discharge port 72. Therefore, in the third operation when the sheet SB is conveyed, the gate 81 rotates in the A direction such that the rotation amount is indicated by 1.

The fourth operation controls the operation of the gate 81 so that the first contact point of the gate 81 continuously comes into contact with the front surface and the trailing end of the sheet to be conveyed. The fourth operation controls a rotation amount of the gate 81 according to the type of sheet. For example, in order that the first contact point of the gate 81 continuously comes into contact with the front surface and the trailing end of the sheet SA to be conveyed, the gate 81 rotates in the B direction such that the rotation amount is indicated by 1. For example, in order that the first contact point of the gate 81 continuously comes into contact with the front surface and the trailing end of the sheet SB to be conveyed, the gate 81 rotates in the B direction such that the rotation amount is indicated by 2.

The fifth operation indicates an operation of the gate 81 when a trailing end of a sheet passes through the first contact point of the gate 81. The fifth operation returns the positions of the gate 81 rotated by the third operation and the fourth operation to the initial position. For example, when the trailing end of the sheet SA passes through the first contact point of the gate 81, the gate 81 rotates in the A direction such that the rotation amount is indicated by 1. For example, when the trailing end of the sheet SB passes through the first contact point of the gate 81, the gate 81 rotates in the A direction such that the rotation amount is indicated by 1.

Figure 9:
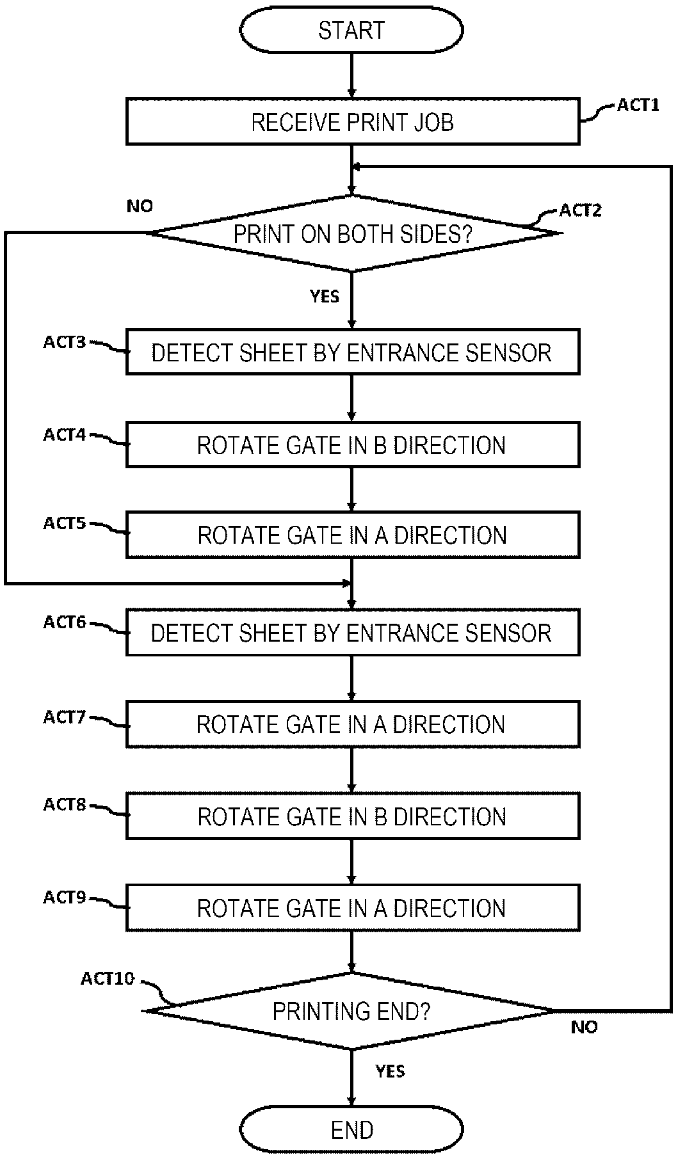
FIG. 9 is a flowchart showing an operation example of the multifunction peripheral when the sheet is discharged.

FIG. 9 is a flowchart showing an operation example of the multifunction peripheral 1 when a sheet is discharged. The operation example when the multifunction peripheral 1 prints an image on a sheet will be described with reference to FIGS. 8 and 9. The multifunction peripheral 1 receives a print job (FIG. 9, ACT 1). The print job includes information on the type of a sheet to be conveyed and information on the processing surface of the sheet as the sheet information. The control unit 12 reads gate information from the storage unit 11 based on the sheet information of the print job. When the print job is received, the sheet is fed from the paper feed unit 6, and the printer 5 forms a toner image on the sheet. Thereafter, the sheet is conveyed from the printer 5 through the fixing roller 51 to the paper discharge unit 7.

The control unit 12 determines whether to print on the one side or the both sides of the sheet based on the print job (FIG. 9, ACT 2). When the printing is performed on the both sides (FIG. 9, ACT 2, YES) and the entrance sensor 71 detects the sheet conveyed to the paper discharge unit 7 (FIG. 9, ACT 3), the control unit 12 controls the motor 82 to rotate the gate 81 in the B direction (FIG. 9, ACT 4). That is, the sheet to be conveyed is controlled to be guided to the inversion unit 9. For example, when the printing is performed on the both sides of sheet SB according to the present embodiment, a pulse signal is transmitted to the motor 82 three times so that the gate 81 rotates in the B direction (FIG. 8, the first operation).

When the sheet is conveyed to the inversion unit 9 and the inversion sensor 91 detects the sheet, the control unit 12 controls the motor 82 to rotate the gate 81 in the A direction so that the position of the gate 81 becomes the initial position (FIG. 9, ACT 5). For example, when the printing is performed on the both sides of the sheet SB according to the present embodiment, the pulse signal is transmitted to the motor 82 three times so that the gate 81 rotates in the A direction (FIG. 8, the second operation). When the position of the gate 81 becomes the initial position, the control unit 12 rotates the inversion roller in reverse direction and conveys the sheet in the direction of the broken line arrow E shown in FIG. 5. The sheet is conveyed to the registration roller 52 located upstream of the fixing roller 51 in the conveyance direction. A surface of the sheet that passes through the inversion unit 9 is inverted from the surface of the sheet that is fed from the paper feed unit 6. In addition, a position of the gate 81 when the sheet is switched back may be a position at which the sheet is not conveyed reversely in a direction of the entrance sensor 71 and a position at which the sheet can be conveyed in the direction of the broken line arrow E.

According to the present embodiment, as shown in FIG. 8, the first operation and the second operation are not performed in the case of one-sided printing.

When the printing is performed on the both sides (FIG. 9, ACT 2, YES) and the entrance sensor 71 detects the sheet for the second time (FIG. 9, ACT 6), or when the printing is performed on the one side (FIG. 9, ACT 2, NO) and the entrance sensor 71 detects the sheet for the first time (FIG. 9, ACT 6), the control unit 12 controls the motor 82 to rotate the gate 81 in the B direction (FIG. 9, ACT 7). For example, when the printing is performed on the both sides of the sheet SB according to the present embodiment, the pulse signal is transmitted to the motor 82 once so that the gate 81 rotates in the A direction (FIG. 8, the third operation). In the ACT 7, the rotation amount of rotating the gate 81 is based on the type of the sheet to be conveyed. By setting the position of the gate 81 to a position suitable for the type of the sheet, the load applied to the sheet and the multifunction peripheral 1 can be reduced. Depending on the type of sheet, the position of the gate 81 may be maintained at the initial position without being changed. For example, when printing is performed on the sheet SA according to the present embodiment, the pulse signal is not transmitted, and thus the gate 81 does not rotate (FIG. 8, the third operation).

When the control unit 12 controls the motor 82 to rotate the gate 81 in the B direction so that the front surface and the trailing end of the sheet to be conveyed continuously come into contact with the first contact point of the gate 81 (FIG. 9, ACT 8). For example, when the printing is performed on the both sides of sheet SB according to the present embodiment, the pulse signal is transmitted to the motor 82 twice so that the gate 81 is driven in the B direction (FIG. 8, the fourth operation). By rotating the gate 81 in the B direction so that the front surface and the trailing end of the sheet continuously come into contact with the first contact point of the gate 81, the noise generated when the trailing end of the sheet comes into contact with the gate 81 in a manner of hitting the gate 81 due to the returning force of the curved sheet is reduced.

When the sheet is discharged from the first paper discharge port 72, the control unit 12 controls the motor 82 to rotate the gate 81 in the A direction so that the position of the gate 81 becomes the initial position (FIG. 9, ACT 9). For example, when the printing is performed on the both sides of the sheet SB according to the present embodiment, the pulse signal is transmitted to the motor 82 once so that the gate 81 rotates in the A direction (FIG. 8, the fifth operation).

If there is no image to be printed continuously (FIG. 9, ACT 10, YES), the control is ended. When there is an image to be printed continuously (FIG. 9, ACT 10, NO), the control unit 12 controls the multifunction peripheral 1 to print the image based on the print job.

According to the present embodiment, the control unit 12 controls the operations in the ACT 4 and the ACT 7 based on a timing when the entrance sensor 71 detects the sheet. Alternatively, the control unit 12 may control the operations in ACT 4 and ACT 7 based on a timing when the registration roller 52 is activated.

Figure 10:
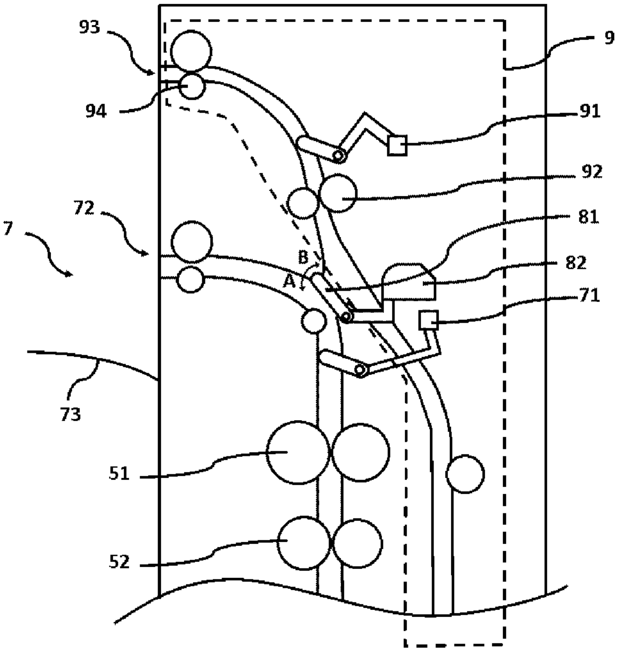
FIG. 10 is a diagram showing a modification of a gate.

FIG. 10 is a diagram showing a modification of the gate 81 according to the present embodiment. The modification states that a shaft for rotating the gate 81 is located on an upstream side of a distal end of the gate 81 in a paper discharge direction of the sheet. The gate 81 shown in FIG. 10 is driven by the motor 82 and rotates in the directions of the arc arrows A and B.

In the modification, the gate 81 has a second contact point. In the state in which there is no step between the conveyance path 21 and the gate 81 in the posture to guide a sheet to the first paper discharge port 72 of the paper discharge unit 7, or in the state in which the gate 81 in the posture is raised from the conveyance path 21, a point located at a position at which the gate 81 in the posture and the trailing end of the sheet to be conveyed to the paper discharge port 72 finally come into contact with each other is referred to as the second contact point. The second contact point may be changed for each sheet to be conveyed.

In the modification, by rotating the gate 81 in the direction (B direction) in which a front surface of a sheet to be conveyed to the paper discharge port 72 and the second contact point are separated from each other, a noise generated when a trailing end of the sheet comes into contact with the conveyance path 21 in a manner of hitting the conveyance path 21 can be reduced. By rotating the gate 81 in the B direction so that the trailing end of the sheet to be conveyed to the paper discharge port 72 does not come into contact with the second contact point of the gate 81, the noise generated when the trailing end of the sheet comes into contact with the conveyance path 21 in a manner of hitting the conveyance path 21 can be further reduced.

According to the present embodiment, the motor 82 is used as a drive source of the gate 81, for example, and a mechanism that rotates the gate 81 to a predetermined position using a plurality of solenoids may be used as the drive source.

According to the present embodiment, the multifunction peripheral 1 is described as an example, but an image decolorable device that decolors an image formed using a developer that can be decolored by heat may be used as the image forming device. In that case, information on a processing surface of a sheet is information on whether to decolor one side of the sheet or both sides of the sheet.

According to the present embodiment, the multifunction peripheral 1 is described as the example, but a printer having no functions such as FAX, scanning, and finisher may be used as the image forming device.

While certain embodiments are described, these embodiments are presented as examples only, and are not intended to limit the scope of the disclosure. Indeed, the novel embodiment described herein may be implemented in a variety of other forms; furthermore, various omissions, substitutions, and changes in the form of the embodiment described herein may be made without departing from the spirit of the disclosure. These embodiments and modifications thereof are included in the scope and the gist of the disclosure and included in the disclosure described in claims and the scope of equivalents of the disclosure.

What is claimed is:

1. An image forming device comprising: a conveyance path which is branched into a plurality of paths and through which a sheet is conveyed along a conveyance direction; a gate provided at a position in the conveyance path at which the conveyance path is branched into the plurality of paths, and configured to switch from one path to another path through which the sheet is conveyed, wherein a point at which the gate and a trailing end of the sheet to be conveyed first come into contact with one another is referred to as a first contact point; and a controller configured to control the gate to rotate in a direction in which position of the first contact point of the gate is more on an upstream side in a conveyance direction of the sheet before the trailing end of the sheet reaches the first contact point of the gate; wherein the controller controls the gate at a timing when the sheet to be conveyed passes through the gate.

2. The image forming device according to claim 1, wherein the controller is configured to change a position suitable for each type of sheet by rotating the gate according to the type of sheet to be conveyed.

3. The image forming device according to claim 1, further comprising:

an entrance sensor provided on an upstream side of the gate in a conveyance direction of the sheet, and configured to detect that the sheet is conveyed, wherein the controller executes the control based on a detection result of the entrance sensor.

4. The image forming device according to claim 1, further comprising:

a registration roller provided on an upstream side of the gate in the conveyance direction of the sheet, and configured to optionally convey the sheet by the controller, wherein the controller executes the control based on a timing of driving the registration roller.

5. The image forming device according to claim 1, wherein the conveyance path is branched into a first path and a second path.

6. The image forming device according to claim 1, further comprising:

a motor configured to drive the gate, the motor comprising a stepping motor that rotates in a normal direction or in a reverse direction by a predetermined rotation amount each time a pulse signal is received.

7. An image forming device for one sided printing or two sided printing, comprising: a conveyance path which is branched into a plurality of paths and through which a sheet is conveyed along a conveyance direction; and a gate provided at a position in the conveyance path at which the conveyance path is branched into the plurality of paths, and configured to switch from one path for one sided printing to another path for two sided printing through which the sheet is conveyed, wherein a point at which the gate and a trailing end of the sheet to be conveyed first comes into contact with one another is referred to as a first contact point; and a controller configured to control the gate to rotate in a direction of which position of the first contact point of the gate is to be more in an upstream side in the conveyance direction of the sheet before the trailing end of the sheet reaches the first contact point of the gate; wherein the controller controls the gate at a timing when the sheet to be conveyed passes through the gate.

8. The image forming device according to claim 7, wherein the controller is further configured to change the position of the gate to a position suitable for each type of sheet by rotating the gate according to the type of sheet to be conveyed.

9. The image forming device according to claim 7, further comprising:

an entrance sensor provided on an upstream side of the gate in a conveyance direction of the sheet, and configured to detect that the sheet is conveyed, wherein the controller executes the control based on a detection result of the entrance sensor.

10. The image forming device according to claim 7, further comprising:

a registration roller provided on an upstream side of the gate in the conveyance direction of the sheet, and configured to optionally convey the sheet by the controller, wherein the controller executes the control based on a timing of driving the registration roller.

11. The image forming device according to claim 7, further comprising:

a motor configured to drive the gate, the motor comprising a stepping motor that rotates in a normal direction or in a reverse direction by a predetermined rotation amount each time a pulse signal is received.

12. A sheet path switching apparatus, comprising: a conveyance path which is branched into a plurality of paths and through which a sheet is conveyed along a conveyance direction; and a gate provided at a position in the conveyance path at which the conveyance path is branched into the plurality of paths, and configured to switch from one path to another path through which the sheet is conveyed, wherein a point at which the gate and a trailing end of the sheet to be conveyed first come into contact with one another is referred to as a first contact point; and a controller configured to control the gate to rotate in a direction of which position of the first contact point of the gate is to be more at an upstream side in the conveyance direction of the sheet before the trailing end of the sheet reaches the first contact point of the gate; wherein the controller controls the gate at a timing when the sheet to be conveyed passes through the gate.

13. The sheet path switching apparatus according to claim 12, wherein the controller is further configured to change the position of the gate to a position suitable for each type of sheet by rotating the gate according to the type of sheet to be conveyed.

14. The sheet path switching apparatus according to claim 12, further comprising:

an entrance sensor provided on an upstream side of the gate in a conveyance direction of the sheet, and configured to detect that the sheet is conveyed, wherein the controller executes the control based on a detection result of the entrance sensor.

15. The sheet path switching apparatus according to claim 12, further comprising:

a registration roller provided on an upstream side of the gate in the conveyance direction of the sheet, and configured to optionally convey the sheet by the controller, wherein the controller executes the control based on a timing of driving the registration roller.

16. The sheet path switching apparatus according to claim 12, wherein the conveyance path is branched into a first path and a second path.

17. The sheet path switching apparatus according to claim 12, further comprising:

a motor configured to drive the gate, the motor comprising a stepping motor that rotates in a normal direction or in a reverse direction by a predetermined rotation amount each time a pulse signal is received.

* * * * *